Sept. 29, 1931.   R. C. ALLEN   1,824,863
PACKING GLAND
Filed Aug. 11, 1926

R.C.Allen
INVENTOR

BY   A. B. Reavis
ATTORNEY

Patented Sept. 29, 1931

1,824,863

UNITED STATES PATENT OFFICE

ROBERT C. ALLEN, OF SWARTHMORE, PENNSYLVANIA, ASSIGNOR TO WESTINGHOUSE ELECTRIC & MANUFACTURING COMPANY, A CORPORATION OF PENNSYLVANIA

PACKING GLAND

Application filed August 11, 1926. Serial No. 128,669.

My invention relates to liquid sealed glands of the rotary type and it has for its object to provide apparatus of this character wherein the opportunity for leakage shall be minimized.

A gland of the rotary type, incorporating a runner or impeller, is frequently used in connection with a shaft for sealing the latter where it passes through a wall or casing having different pressures at the sides thereof. For example, glands of this character are frequently employed for the purpose of sealing the shaft or spindle of a steam turbine.

In accordance with my invention, I provide a runner construction having a base ring portion with an outwardly extending flange and to opposite sides of the latter are secured vaned elements. The base ring, the flange, and the vaned elements are so formed that these parts may be held together as a unit without any perforations or bolt holes, whereby the possibility of air leakage through the runner structure is avoided.

This and other objects are effected by my invention as will be apparent from the following description and claims taken in connection with the accompanying drawings, forming a part of this application, in which:

Figures 1, 2:
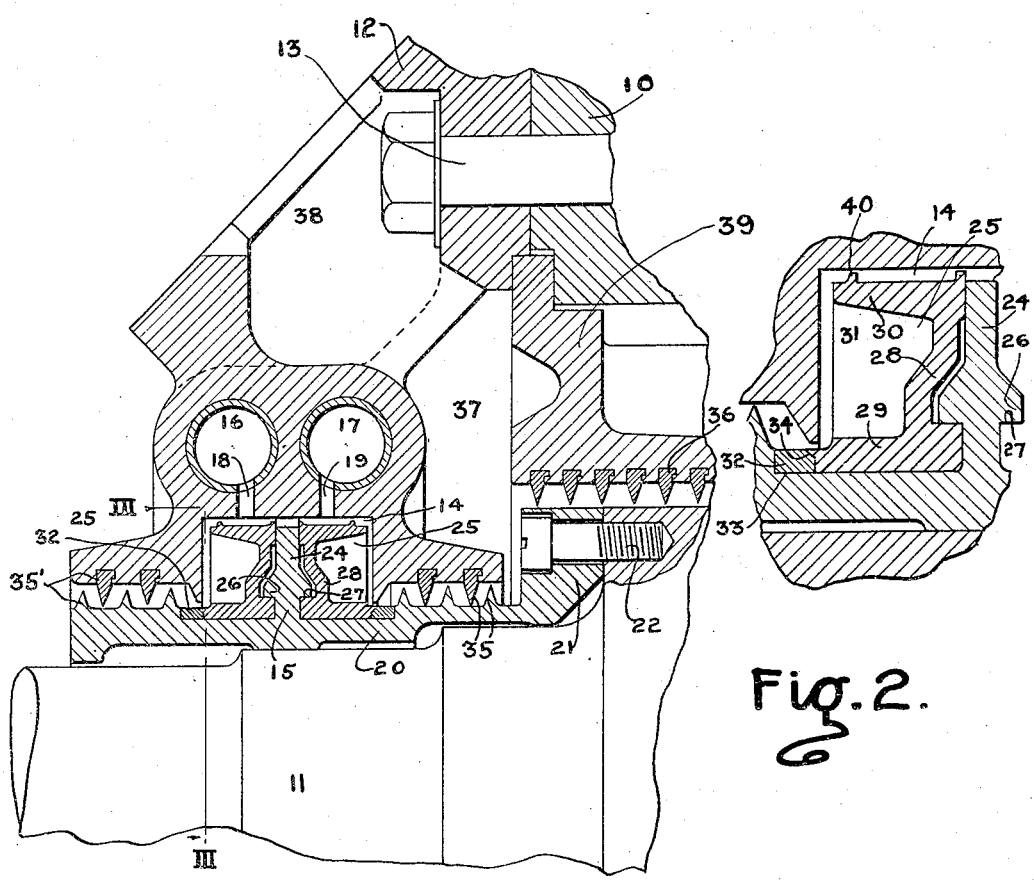
Fig. 1 is a section transversely of the gland.
Fig. 2 is a sectional view on the same plane as Fig. 1, showing a detail thereof on a larger scale.
Figure 3:
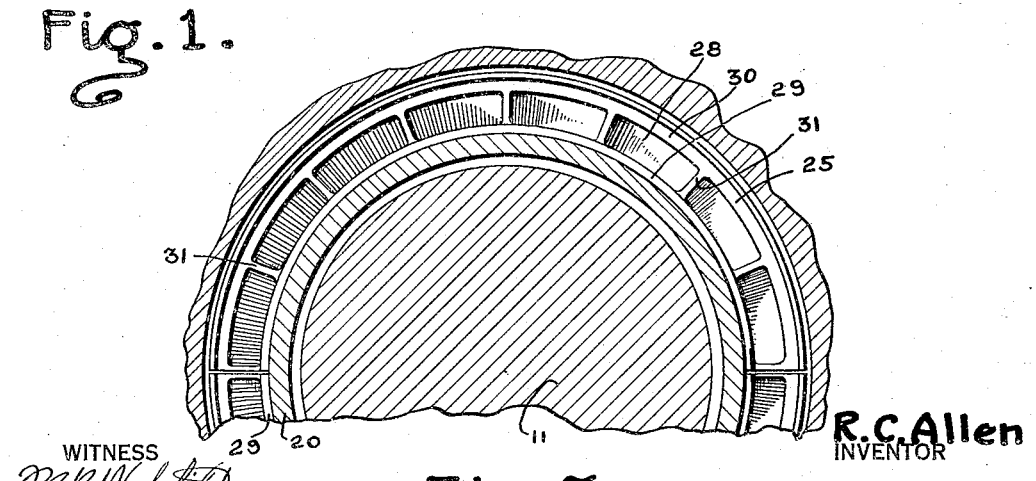
Fig. 3 is a section on the plane III—III of Fig. 1.

Referring to the drawings more in detail, I show an elastic fluid turbine casing 10, having a shaft 11 rotating therein. A gland casing 12 is attached to the casing 10, as by means of bolts 13. In the casing 12 is formed an annular housing 14, which retains the sealing fluid.

When the gland is used for sealing the vacuum end of a turbine, sealing fluid is supplied to the housing by a chamber 17 through conduits 19 provided at intervals around the circumference of the housing, and withdrawn from the housing by chamber 16 through openings 18. The sealing fluid thus travels through the housing in a direction counter to that of air, which tends to leak in, and carries such air out through openings 18.

If the gland is used at the high pressure end of a turbine, the sealing fluid is supplied through chamber 16 and conduits 18 and withdrawn through conduits 19 to chamber 17.

The specific means of supplying sealing fluid is the subject matter of another application and forms no part of the present invention.

A gland runner 15, carried by the shaft 11, rotates in the housing 14 and maintains the annulus of sealing fluid against the outer walls of the housing. The gland runner comprises a unitary base ring 20 in the form of a collar or sleeve, having an integral flange 21 at one end thereof for attachment to the shaft. This base ring may be shrunk onto the shaft. The side of this flange at the inner end of the ring forms a plane surface which meets a similar plane surface on the shaft. The flange is secured to the shaft by means of bolts 22.

In operation, when the shaft and runner become heated, the runner may expand at a greater rate than the shaft, thereby tending to create a space between the two. However, as the meeting surfaces on the flange and the shaft lie in a plane perpendicular to the axis of the shaft, relative expansion of the flange will merely cause it to slide along the adjacent surface of the shaft but will not separate it therefrom. The chance of air leakage between the base ring 20 and the shaft 11 is thereby practically eliminated.

The base ring 20 has also formed integrally therewith the flange 24 which extends continuously around the periphery thereof. The outer edge of flange 24 extends into the housing 14 sufficiently to make direct contact with the sealing liquid therein. To the sides of flange 24, are secured the elements 25, which carry impelling vanes 31. These vaned elements are semi-circular in the illustrated embodiment. Obviously the annular or vaned elements on each side may be divided into as many segments as desired. It will be seen that in the present embodiment there are four vaned elements 25.

While vaned elements are customarily provided on both sides of the flange, the provision of these elements on one side only would be within the scope of the invention. In such case, these elements would preferably be provided on the side subjected to the lower pressure.

The flange 24 is provided with projections 26 having inwardly facing surfaces 27. The vaned elements 25 comprise a central web 28, the inner edge of which is curved around projection 26 of the flange 24. At the inner end of web 28 is base flange 29, one end of which projects beyond web 28 to engage with the inwardly facing surface 27. At the outer end of web 28 is flange 30. Blades or vanes 31 are provided at spaced intervals across the channel formed by web 28 and flanges 29 and 30, and provide the means of imparting centrifugal force to the sealing medium. Projections 40 are formed on the outer periphery of flange 30, providing a close clearance between the runner and the housing.

The flange 29 is fitted in a recess 33 cut in the base ring 20 adjacent to flange 24 and moved toward the flange to bring its inner margin into engagement with surface 27. A caulking strip 32 is then inserted between flange 29 and the opposite side of recess 33 to retain the vaned element in position. The caulking strip 32 is formed with a bevel edge 34 and it is held in place by peening over the adjacent edge of vaned element 25 over onto the beveled edge.

Labyrinth packing elements 35′ are disposed on the outer side of the packing gland and similar elements 35 on the inner side. A cylinder 39 inserted within the casing 10 carries additional labyrinth packing elements 36. Between the labyrinth packing elements 35 and the elements 36 is an annular chamber 37 having an opening 38 communicating therewith.

The labyrinth packing elements 35 and 39 between the liquid seal and the interior of the turbine, at the vacuum end of the turbine, baffle any water or steam bubbles which might escape from the gland. The greater part of such water or steam bubbles carried through elements 35 is drawn off from annular chamber 37, through opening 38 and a suitable steam trap, so that water is prevented from entering the turbine.

In some cases it may be desirable to use a steam seal for starting. In such cases steam may be admitted, through opening 38 and chamber 37, to the labyrinth packing. In case the gland construction is used at the high-pressure end of a turbine, the chamber 37 may be connected to a suitable turbine stage, thereby providing for vaporization in such chamber and the prevention of steaming at the atmospheric side.

The base ring 20 and vaned elements 25 may be made of any desired material, although they are preferably made of material which will withstand the corrosive and erosive action of the sealing fluid. For this purpose, the base ring may be made of stainless steel and the vaned elements of cast bronze.

From the above description, it will be seen that all possibility of air leakage has been practically eliminated. Since the flange 24 is integral with base ring and contains no openings, no fluid may leak therethrough. Any leakage between the vaned elements and the flange would have to pass through the sealing fluid. The vaned elements constitute the parts which are nearest to the casing and receive all damage in case of accident. These parts may be readily removed and new elements inserted.

While I have shown my invention in but one form it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

I claim as my invention:

1. In a fluid seal packing gland, the combination of a stationary member having an annular housing and sealing fluid inlet means communicating therewith, a rotating member extending into the stationary member and having an imperforate flange unitary therewith extending into the housing, said flange being formed with a surface facing radially inwardly, a separate removable impeller element disposed at the side of the flange and abutting against said surface, and means for securing the impeller element in position.

2. In a fluid seal packing gland, the combination of a stationary member having an annular housing and sealing fluid inlet means communicating therewith, a rotating member extending into the stationary member and having an imperforate flange unitary therewith extending into the housing, said flange being formed with an inwardly facing surface, a recess in the rotating member adjacent to the flange, a separate removable impeller element seated in the recess and against the side and the inwardly facing surface of the flange, and a caulking strip between the impeller element and the opposite side of the recess.

3. In a device for sealing a rotating shaft, the combination of a stationary housing and a rotatable runner disposed within the housing for maintaining a sealing annulus, the runner comprising a cylindrical collar on the shaft, an imperforate radially extending flange integral with the collar, said flange being formed with a surface facing radially inwardly, said collar having a recess adjacent to the flange, and a separate removable vaned impeller element seated in the recess in the collar and against the flange and its inwardly facing surface, and means disposed between the vaned element and the opposite side of the recess for retaining said impeller element against the flange.

4. In a fluid seal packing gland, the combination of a stationary member having an annular inwardly-opening housing, a rotating member extending into the stationary member and having an imperforate flange extending into the housing, the outer periphery of said flange being in close proximity to the peripheral wall of said housing, and a separate removable impeller element secured to the side of the flange for imparting centrifugal force to the sealing fluid.

5. In a device for sealing a rotating shaft, the combination of a stationary housing, a rotatable runner disposed within the housing for maintaining a sealing annulus, said runner comprising a collar on the shaft formed with an imperforate flange and a separate removable impeller element secured to the side of the flange, said flange and impeller element having inter-locking projections for securing the impeller element to the side of the flange, and means for maintaining the runner element in engagement with the flange.

In testimony whereof, I have hereunto subscribed my name this 27th day of July, 1926.

ROBERT C. ALLEN.